US008405973B2

(12) United States Patent
Huang (10) Patent No.: US 8,405,973 B2
(45) Date of Patent: Mar. 26, 2013

(54) NOTEBOOK COOLING PAD, FAN SEAT, DOCKING STATION, AND/OR CARD READING STATION COMBINATION DEVICE (76) Inventor: Cheng Yu Huang, Taipei (TW)

( * ) Notice: Subject to any disclaimer, the term of this patent is extended or adjusted under 35 U.S.C. 154(b) by 326 days.

(21) Appl. No.: 12/971,271

(22) Filed: Dec. 17, 2010

(65) Prior Publication Data
US 2012/0155013 A1 Jun. 21, 2012

(51) Int. Cl.
G06F 1/16 (2006.01)

(52) U.S. Cl. .................... 361/679.41; 454/117; 415/203; 165/185; 206/438

(58) Field of Classification Search ............ 439/620.21, 439/92, 638, 500, 540.1, 79, 571, 541.5; 361/695, 697, 679.47, 679.41, 679.43, 679.02, 361/679.44, 679.57, 679.04, 679.33, 679.27, 361/679.48, 679.54, 679.21; 206/722, 723, 206/320, 587, 590, 438, 701, 534; 165/121, 165/104.33, 185, 104.31, 80.3; 415/148, 415/142, 98, 229, 632, 53.1, 203; 454/184, 454/343, 354, 353, 237, 117, 162, 346
See application file for complete search history.

(56) References Cited

U.S. PATENT DOCUMENTS

| 8,196,903 B2* | 6/2012 | Jorgensen | 261/30 |
| 2002/0094772 A1* | 7/2002 | Gough | 454/184 |
| 2005/0155755 A1* | 7/2005 | Matsuda et al. | 165/301 |

* cited by examiner

Primary Examiner — Hung Duong
(74) Attorney, Agent, or Firm — Jackson IPG PLLC (57) ABSTRACT The present invention provides a notebook cooling pad, fan seat, docking station, and/or card reading station combination device. The combination device enables a notebook cooling pad to be coupled with a cooling fan, a port, and/or a card reader. The combination device is characterized in that paired symmetric cooling pads can be combined with or separated from a fan seat, a docking station, and/or a card reading station for operational purpose, such that the compact combination device is characterized by multiple purposes, multiple functions, and multiple ways of use.

9 Claims, 13 Drawing Sheets

NOTEBOOK COOLING PAD, FAN SEAT, DOCKING STATION, AND/OR CARD READING STATION COMBINATION DEVICE

BACKGROUND OF THE INVENTION

1. Field of the Invention

The present invention relates to a computer peripheral device for functioning as a notebook cooling pad, a fan seat, a port, and/or a card reader concurrently, and more particularly, to a combination device whereby a notebook cooling pad can be coupled to or separated from a fan seat, a docking station, and/or a card reading station.

2. Description of the Prior Art

Due to the prevalence of computer apparatuses in recent years, the global information explosion is underway. Among the related computer apparatuses, notebook computers are lightweight, compact, high-endurance, and portable. However, given their configurational and structural limitations, notebook computers dissipate heat less efficiently than other information apparatuses, such as personal computers (PC) or servers.

In general, the back of a notebook computer accommodates therein a hard disk drive (HDD), a central processing unit (CPU), and a power supply. Hence, the back of a notebook computer is more likely to generate heat than other portions of the notebook computer. Moreover, a notebook computer in operation is usually placed on a desk with direct contact therebetween. As a result, the maximal heat generating portion of the notebook computer is in direction contact with the desk, thereby accumulating heat.

In attempt to solve the aforesaid problem, the industrial sector puts forth various notebook computer cooling stands that come in different materials but correspond in form and size to a notebook computer. Notebook computers are placed on the notebook computer cooling stands for enhancing heat dissipation. The notebook computer cooling stands are manufactured according to the sizes of intended notebook computers; hence, the area and volume of the notebook computer cooling stands are usually larger than that of the intended notebook computers. Due to their bulkiness and complicated structure, the notebook computer cooling stands thus manufactured have drawbacks, namely low portability, high manufacturing costs, and high selling prices.

In addition, ever-expanding functions of a computer lead to the increasing number of peripheral devices connectable to the computer. Examples of the peripheral devices connectable to a computer are a mouse, input unit, video device, cellular phone, charger, digital camera, card reader, external hard disk drive, output device, and printer. Also, the instances of connection of a host computer and peripheral devices thereof increase with the number of the peripheral devices. Furthermore, to meet the demand for computer data storage, notebook computers often operate in conjunction with flash memory cards which come in various specifications and can be carried with ease; hence, a hub and a card reader are indispensable to a notebook computer and therefore are regarded as notebook accessories. Accordingly, notebook computers are inconvenient to carry, contrary to their outdoor purpose.

In addition, working at a computer keyboard can cause overheated hands, sweaty hands, and torpidity; by contrast, a cooling breeze and a sufficient supply of oxygen are most effective in keeping the hands cool and dry and the mind sharp. To this end, a fan is in place to deliver air to wherever heat dissipation or air supply is required.

In view of the inconvenience in carrying conventional notebook computer cooling stands and the bulkiness thereof, inventors developed simplified notebook cooling pads, as disclosed in Taiwan Patent No. M343192 and U.S. patent application Ser. No. 12/146,157 (patent pending), with a view to overcoming the aforesaid drawbacks of the prior art. However, the disclosure in the aforesaid patent and patent application do not address the issues regarding indispensable functions, such as an expansion/connection/card-reading all-in-one function, a card reading function, and heat-dissipating air providing function. Hence, the inventor of the present invention endeavors to improve on the prior art and eventually proposed the present invention, entitled "Notebook Cooling Pad, Fan Seat, Docking Station, and/or Card Reading Station Combination Device," so as to overcome the aforesaid common drawbacks of the conventional related products concurrently and conclusively.

BRIEF SUMMARY OF THE INVENTION

The inventor of the present invention studies the aforesaid drawbacks of conventional notebook computer cooling stands, notebook cooling pads, cooling fans, USB hubs, and card readers and eventually puts forth a notebook cooling pad, fan seat, docking station, and/or card reading station combination device functioning as a notebook computer cooling stand, a cooling fan, a hub, and/or a card reader concurrently.

A notebook cooling pad, fan seat, docking station, and/or card reading station combination device of the present invention has the following technical features: a connection station fixedly having therein a fan, a USB connecting terminal, or a card reader, wherein the connection station has a housing; two hemispheric cooling pads additionally disposed on the housing of the connection station and configured to operate separately; wherein the two hemispheric cooling pads are convenient to carry around and function as ornaments when additionally disposed on the housing enclosing the fan, the USB connecting terminals, or the card-reading connecting ends; wherein, after being removed from the housing, the two hemispheric cooling pads are positioned beneath a notebook computer to thereby function as cooling pads, respectively; wherein the connection station having therein the fan, the USB connecting terminal, or the card reader functions as a cooling fan, a USB hub, or a card reader, such that the combination device of the present invention functions as a notebook cooling pad, a cooling fan, a USB docking station, and/or a card reader concurrently.

DETAILED DESCRIPTION OF THE EMBODIMENTS OF THE INVENTION

Referring to FIG. 1 through FIG. 5, there are shown diagrams of a notebook cooling pad, fan seat, docking station, and/or card reading station combination device according to the present invention. As shown in the diagrams, a notebook cooling pad and fan seat combination device essentially comprises a fan seat 1, a fan 2, paired symmetric hemispheric cooling pads 3, 3' and a USB cable 4.

Figure 1:
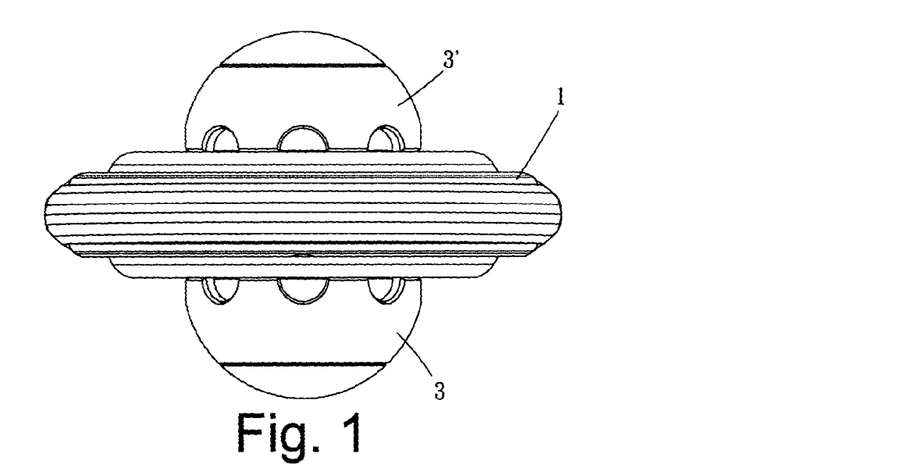
FIG. 1 is a front view of a notebook cooling pad and fan seat combination device when assembled according to the present invention.
Figure 2:
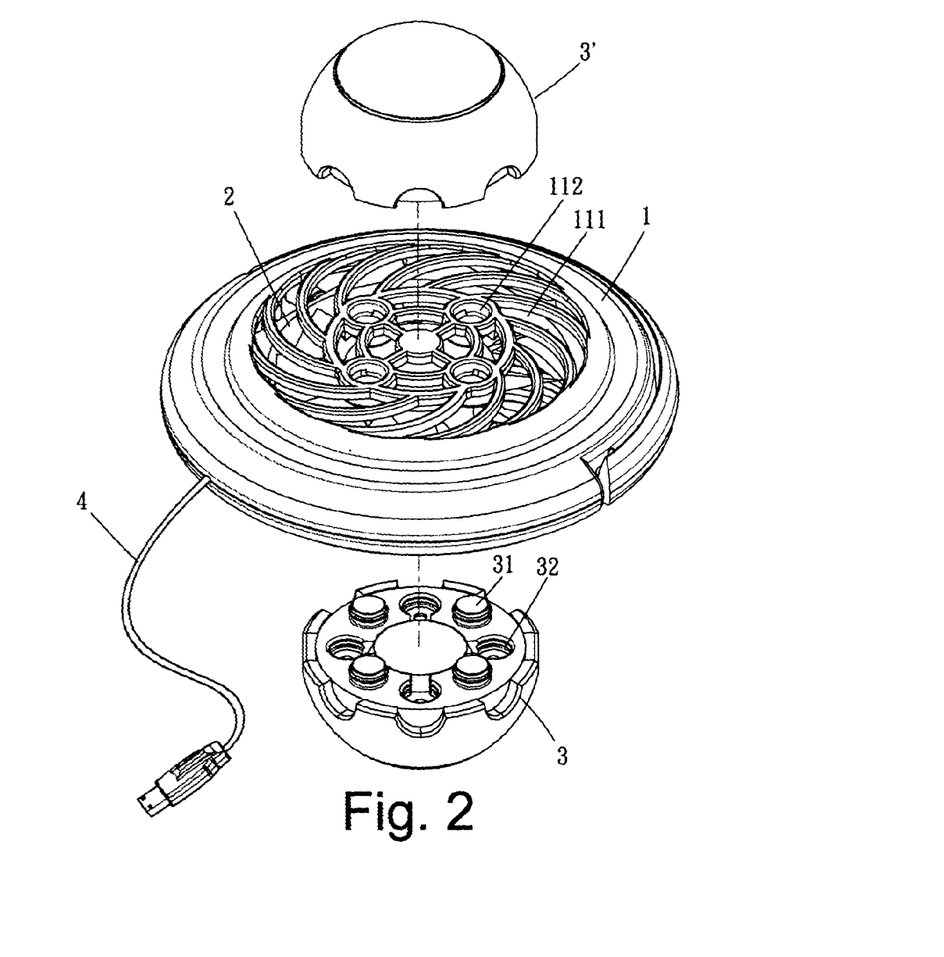
FIG. 2 is a partial exploded perspective view of the notebook cooling pad and fan seat combination device according to the present invention.
Figure 3:
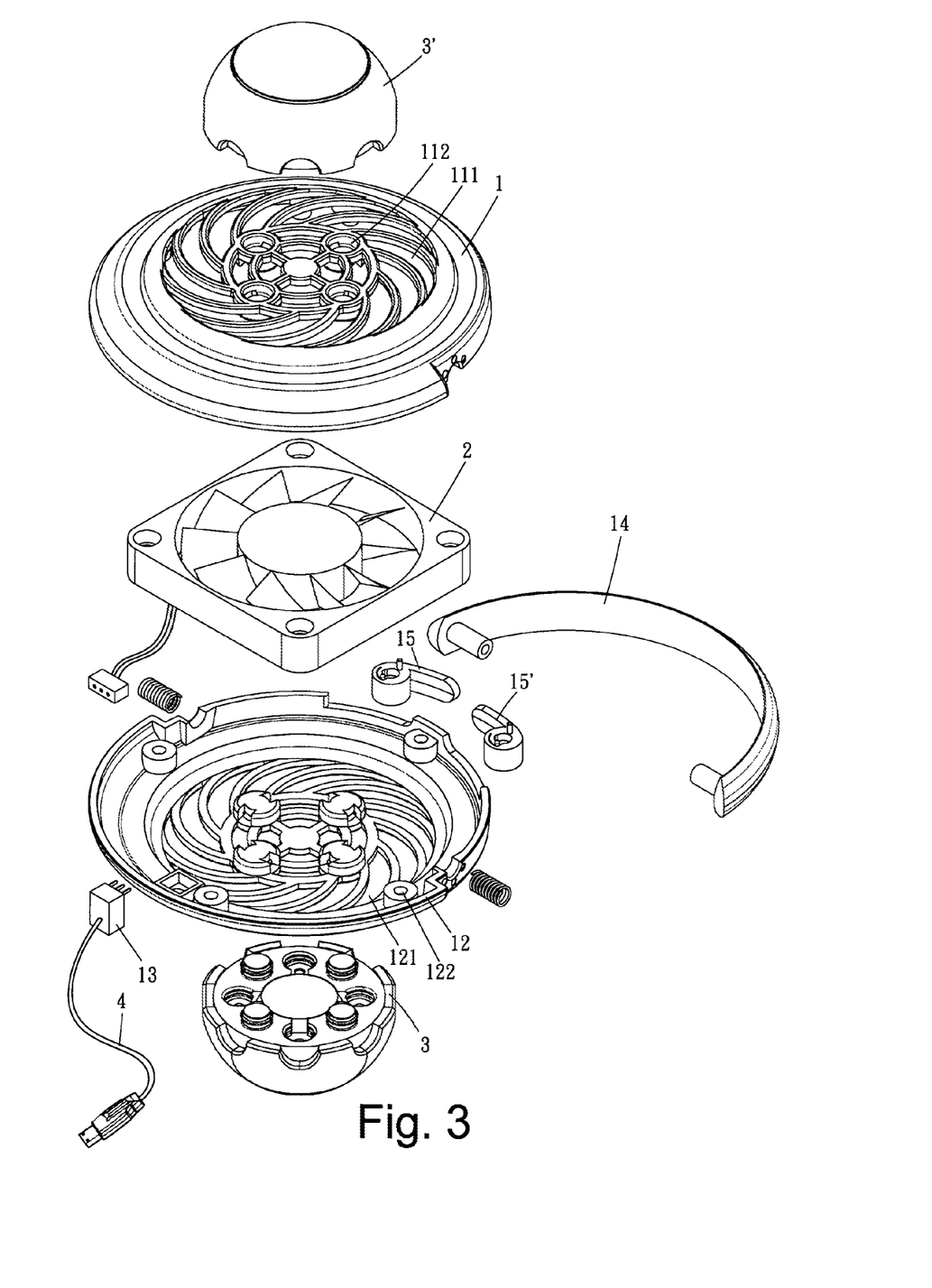
FIG. 3 is an exploded perspective view of the notebook cooling pad and fan seat combination device according to the present invention.

The fan seat 1 comprises an upper cover 11 and a lower cover 12. Ventilating slits 111, 121 and recesses 112, 122 are disposed on the upper cover 11 and the lower cover 12, respectively. The fan 2 is fixedly disposed in an internal space defined between the upper cover 11 and the lower cover 12 and electrically connected to the USB cable 4 through a power terminal 13. The USB cable 4 can be plugged to a USB connecting terminal 71 of a personal computer or a notebook computer 7 so as to receive power for driving the fan 2 to operate.

Referring to FIG. 1 and FIG. 2, paired symmetric flanges 31 and recesses 32 are disposed on mating surfaces of the paired symmetric hemispheric cooling pads 3, 3', such that the paired symmetric hemispheric cooling pads 3, 3' are attached to and coupled to the upper cover 11 and the lower cover 12, respectively, when the flanges 31 of the paired symmetric hemispheric cooling pads 3, 3' are inserted into and engaged with the recesses 112, 122 of the upper cover 11 and the lower cover 12, respectively. Thus, the notebook cooling pad, fan seat, docking station, and/or card reading station combination device functions as a saucer-shaped ornament and can be carried around with ease.

Figure 4:
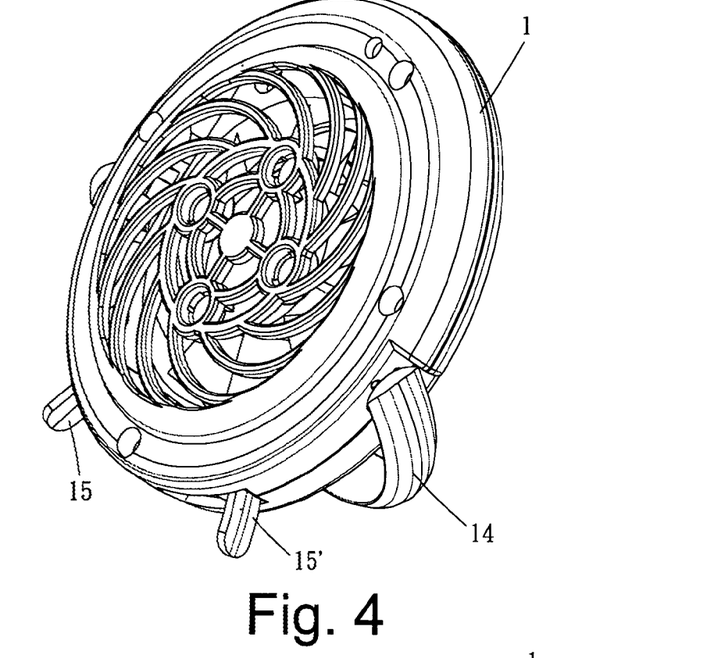
FIG. 4 is a perspective view of a fan seat in operation according to the present invention.
Figure 5:
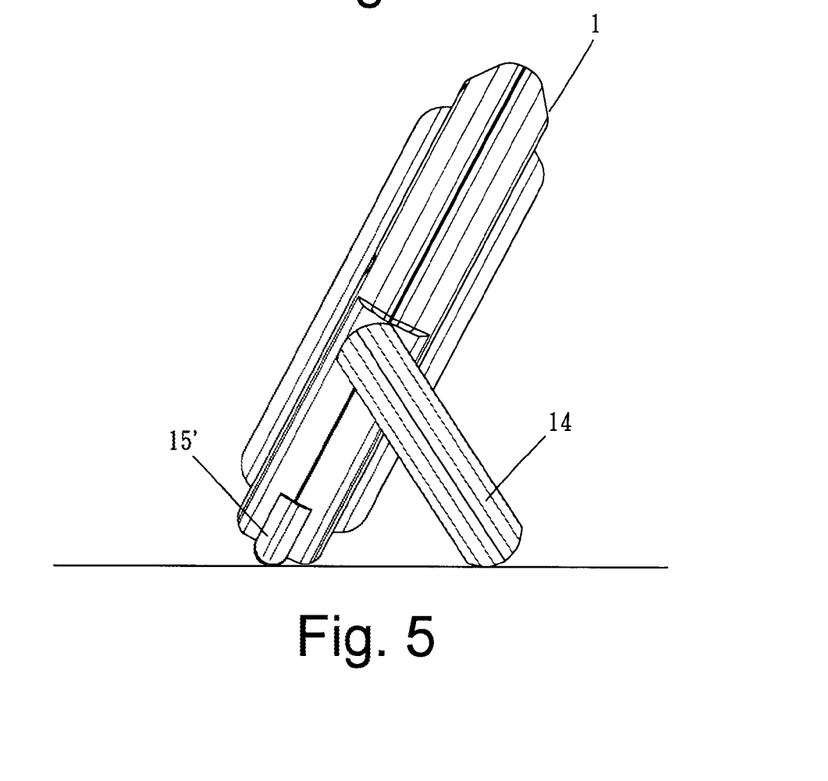
FIG. 5 is a side view of the fan seat in operation according to the present invention.

Referring to FIG. 4 and FIG. 5, the fan seat 1 is provided with a rotating brace 14 and two paired symmetric support elements 15, 15' whereby the fan seat 1 is rotated, unfolded, and orientated at different adjustable angles.

Figure 6:
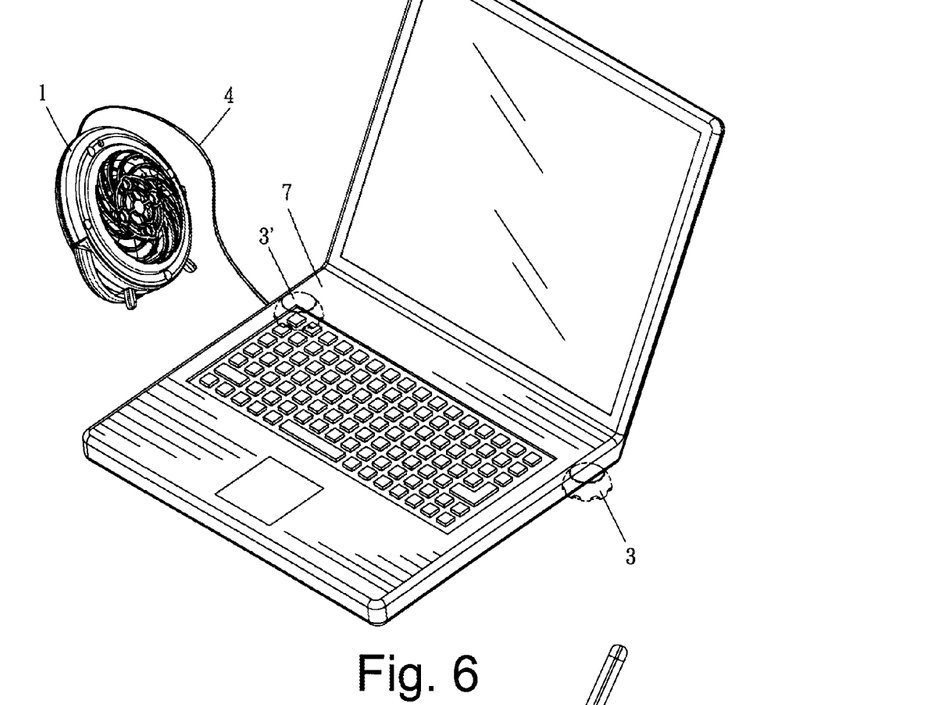
FIG. 6 is a perspective view of notebook cooling pads, the fan seat, and a notebook computer in operation according to the present invention.
Figure 7:
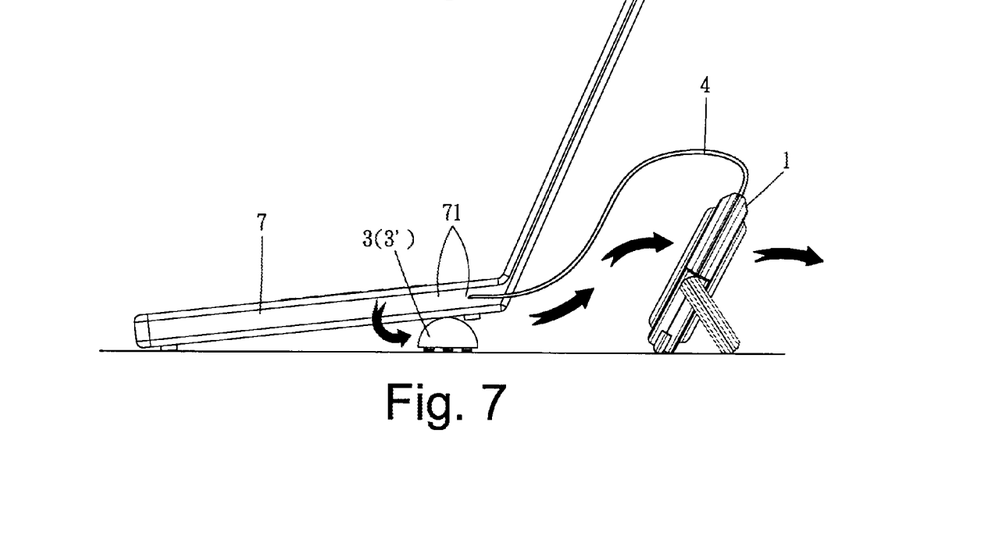
FIG. 7 is a side view of the notebook cooling pads, the fan seat, and the notebook computer in operation according to the present invention.

Referring to FIG. 6 and FIG. 7, the paired symmetric hemispheric cooling pads 3, 3' may be removed from the upper cover 11 and the lower cover 12 and positioned beneath the notebook computer 7 to thereby function as notebook cooling pads, respectively. Furthermore, the fan seat 1 can be adjusted and oriented at an intended angle and positioned before or beside the notebook computer 7 for dissipating heat.

Figure 8:
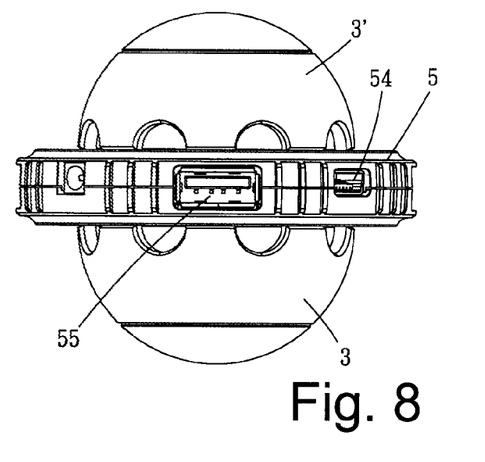
FIG. 8 is a front view of a notebook cooling pad and docking station combination device when assembled according to the present invention.
Figure 9:
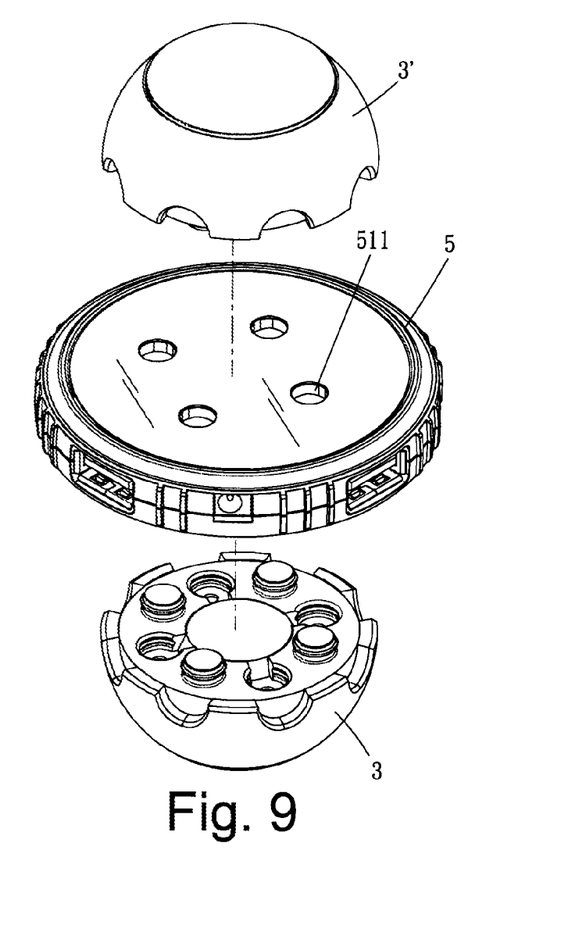
FIG. 9 is a partial exploded perspective view of the notebook cooling pad and docking station combination device according to the present invention.
Figure 10:
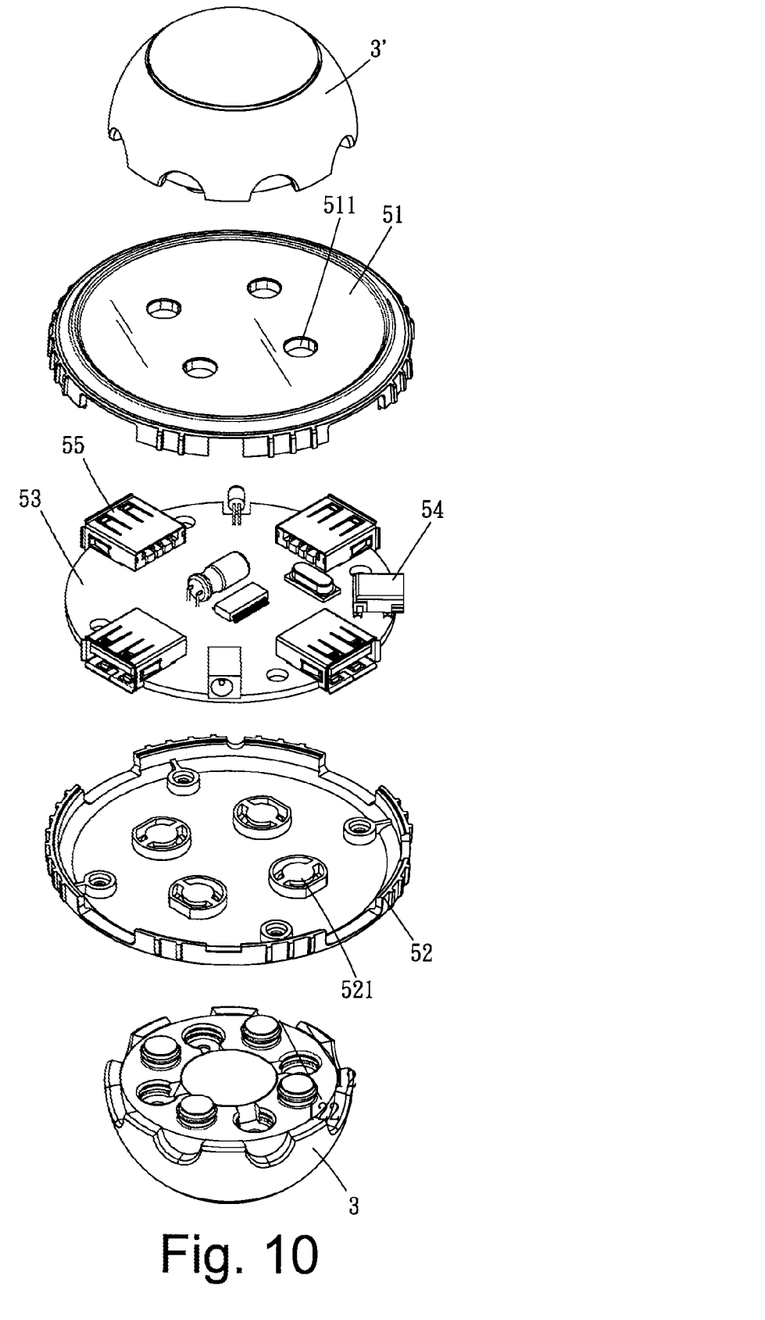
FIG. 10 is an exploded perspective view of the notebook cooling pad and docking station combination device according to the present invention.
Figure 11:
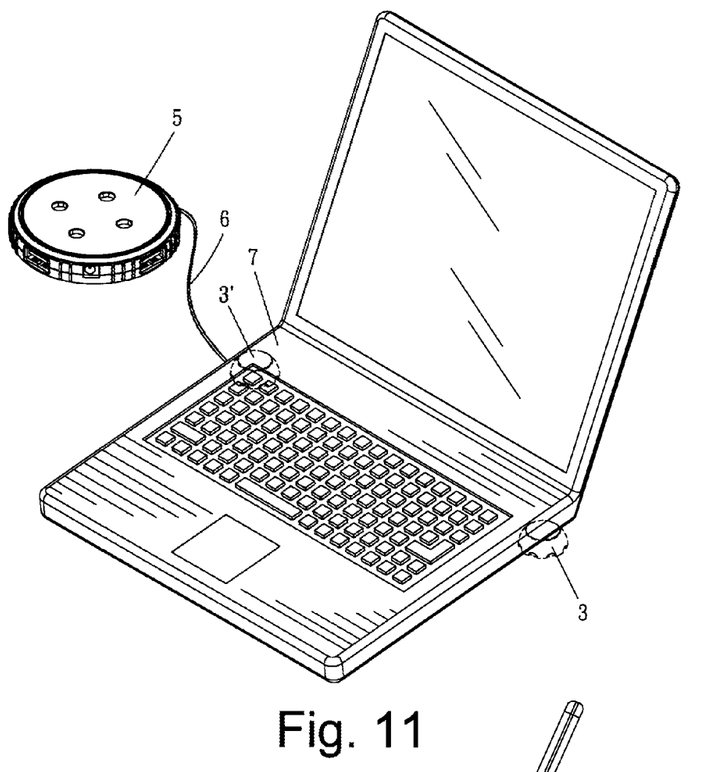
FIG. 11 is a perspective view of notebook cooling pads, a docking station, and a notebook computer in operation according to the present invention.
Figure 12:
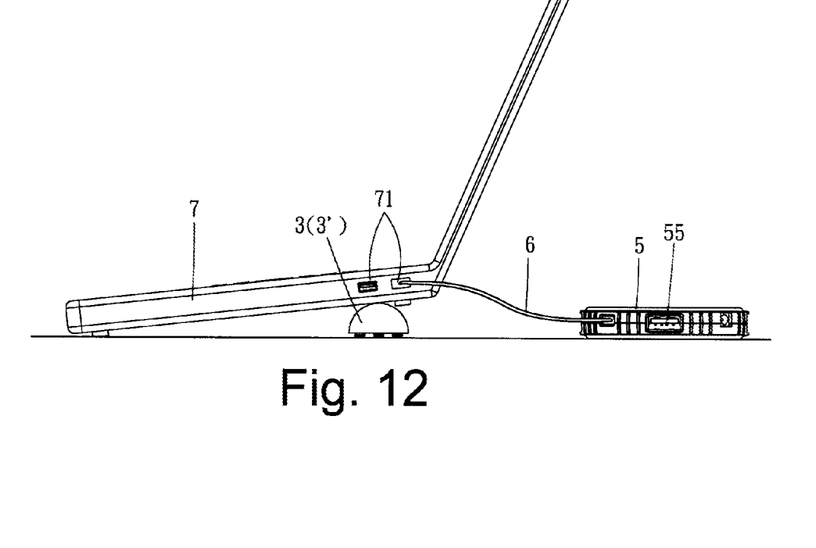
FIG. 12 is a side view of the notebook cooling pads, the docking station, and the notebook computer in operation according to the present invention.

Referring to FIG. 8 through FIG. 10, the present invention provides a notebook cooling pad, fan seat, docking station, and/or card reading station combination device, wherein a notebook cooling pad and docking station combination device involves coupling together the paired symmetric hemispheric cooling pads 3, 3' and a docking station 5. As shown in the drawings, a notebook cooling pad, fan seat, docking station, and/or card reading station combination device essentially comprises the docking station 5, the paired symmetric hemispheric cooling pads 3, 3' and a USB cable 6. The docking station 5 comprises an upper lid 51, a lower lid 52, and a circuit board 53 disposed in an internal space defined with the upper lid 51 and the lower lid 52. Recesses 511, 521 are disposed on the upper lid 51 and the lower lid 52, respectively. A USB input end 54 and a plurality of USB expanding and connecting ends 55 are disposed on the circuit board 53 and electrically connected by the USB cable 6 to the USB connecting terminal 71 of the personal computer or the notebook computer 7 and the USB input end 54 of the docking station 5, as shown in FIG. 11 and FIG. 12, thereby not only providing cooling pads for the notebook computer 7, but also providing the docking station 5 functioning as an external USB hub for use with computer.

Figure 13:
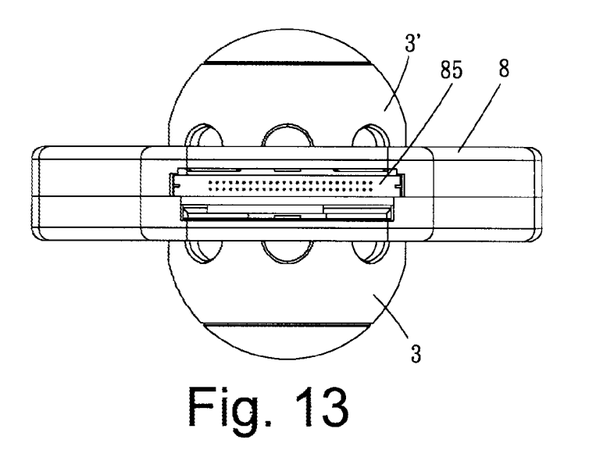
FIG. 13 is a front view of a notebook cooling pad and card reading station combination device when assembled according to the present invention.
Figure 14:
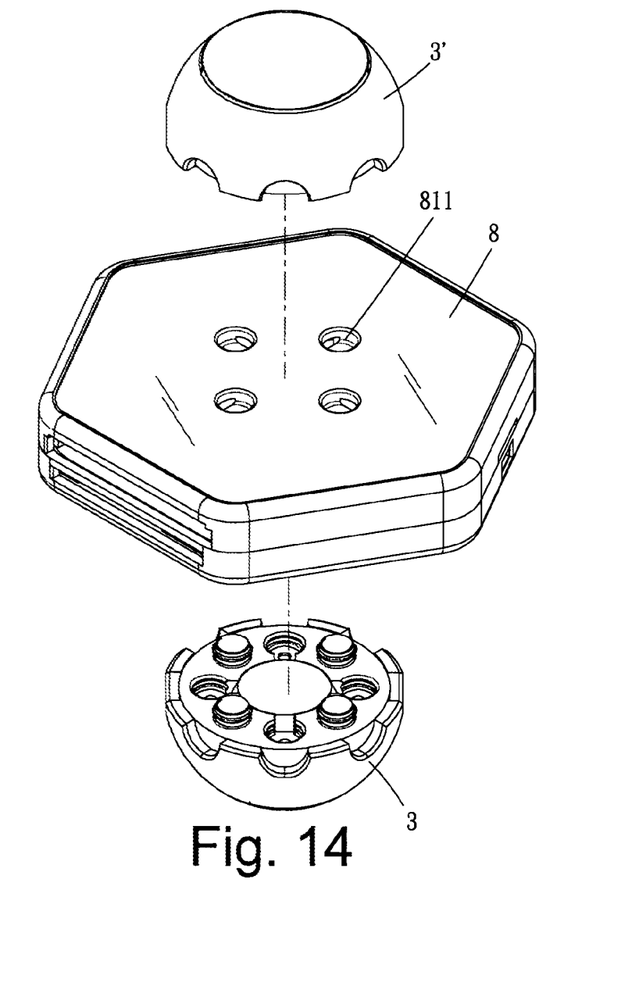
FIG. 14 is a partial exploded perspective view of the notebook cooling pad and card reading station combination device according to the present invention.
Figure 15:
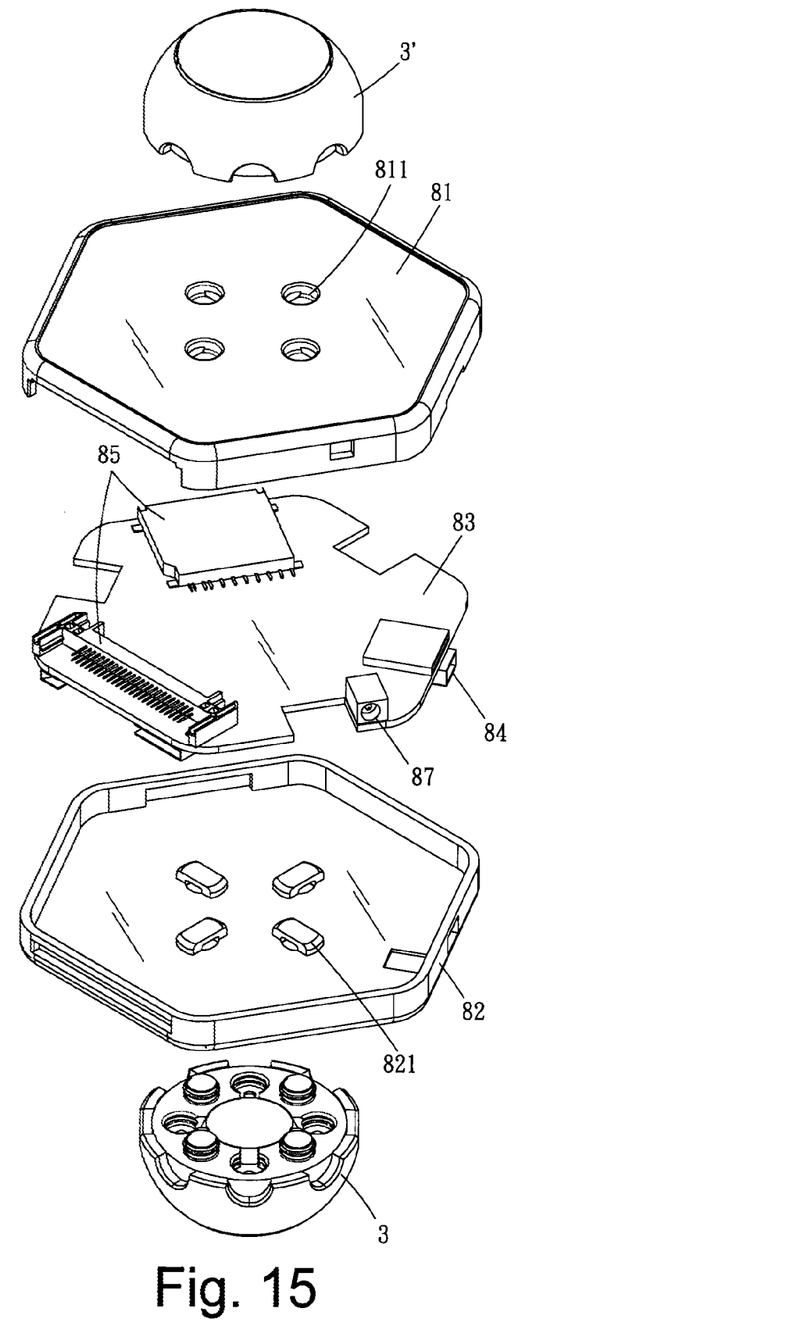
FIG. 15 is an exploded perspective view of the notebook cooling pad and card reading station combination device according to the present invention.
Figure 16:
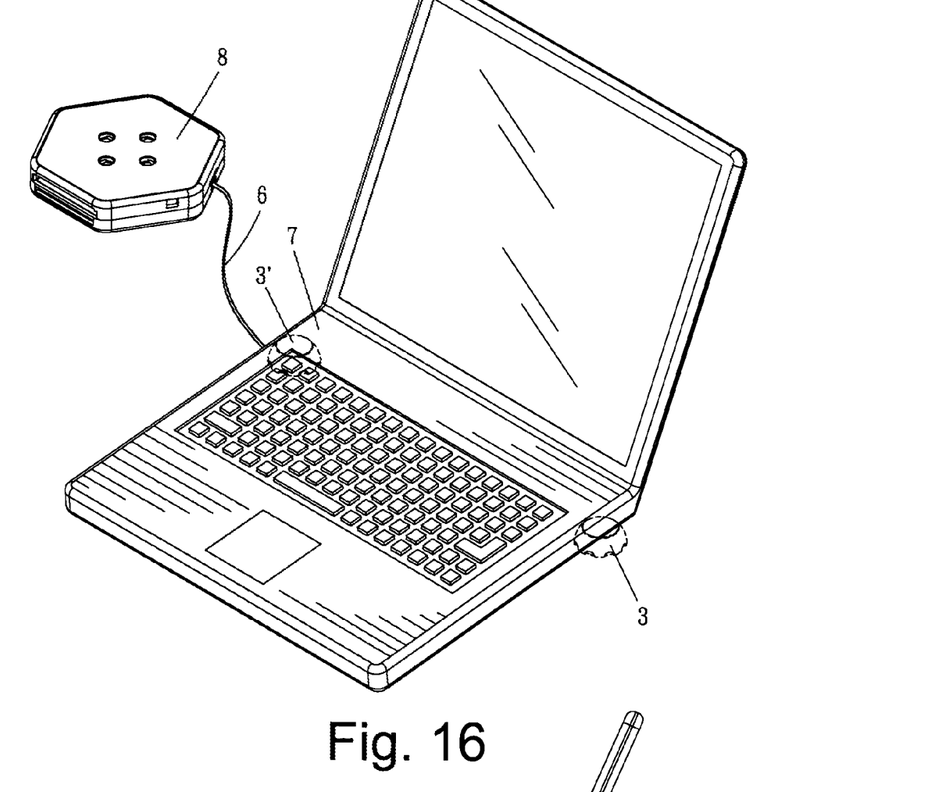
FIG. 16 is a perspective view of notebook cooling pads, a card reading station, and a notebook computer in operation according to the present invention.
Figure 17:
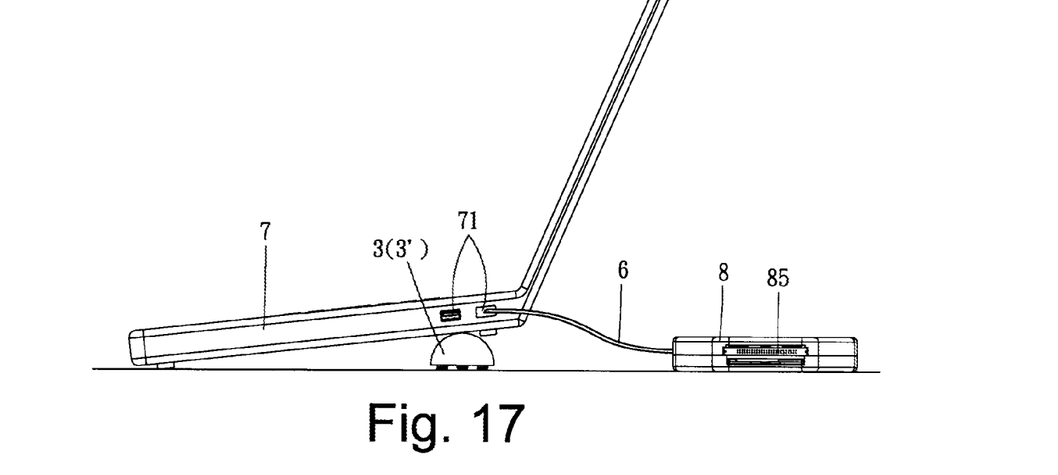
FIG. 17 is a side view of the notebook cooling pads, the card reading station, and the notebook computer in operation according to the present invention.

Referring to FIG. 13 through FIG. 15, the present invention provides a notebook cooling pad, fan seat, docking station, and/or card reading station combination device, wherein a notebook cooling pad and card reading station combination device involves coupling together the paired symmetric hemispheric cooling pads 3, 3' and a card reading station 8. As shown in the drawings, a notebook cooling pad, fan seat, docking station, and/or card reading station combination device essentially comprises the card reading station 8, the paired symmetric hemispheric cooling pads 3, 3', and the USB cable 6. The card reading station 8 comprises an upper covering 81, a lower covering 82, and a circuit board 83 fixedly disposed in an internal space defined by the upper covering 81 and the lower covering 82. Recesses 811, 821 are disposed on the upper covering 81 and the lower covering 82, respectively. A USB input end 84 and a plurality of card-reading connecting ends 85 are disposed on the circuit board 83 and electrically connected by the USB cable 6 to the USB connecting terminal 71 of the personal computer or the notebook computer 7 and a USB input end 84 of the card reading station 8, as shown in FIG. 16 and FIG. 17, thereby not only providing cooling pads for the notebook computer 7, but also providing the card reading station 8 and an external card reader for use with computer.

Figure 18:
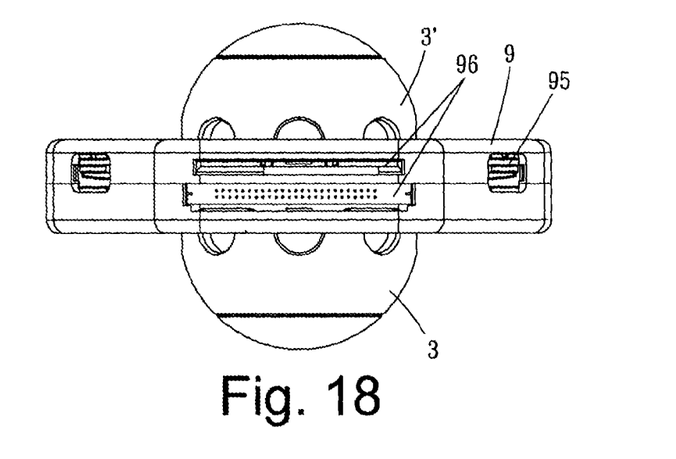
FIG. 18 is a front view of a notebook cooling pad and expansion/connection/card-reading all-in-one station combination device when assembled according to the present invention.
Figure 19:
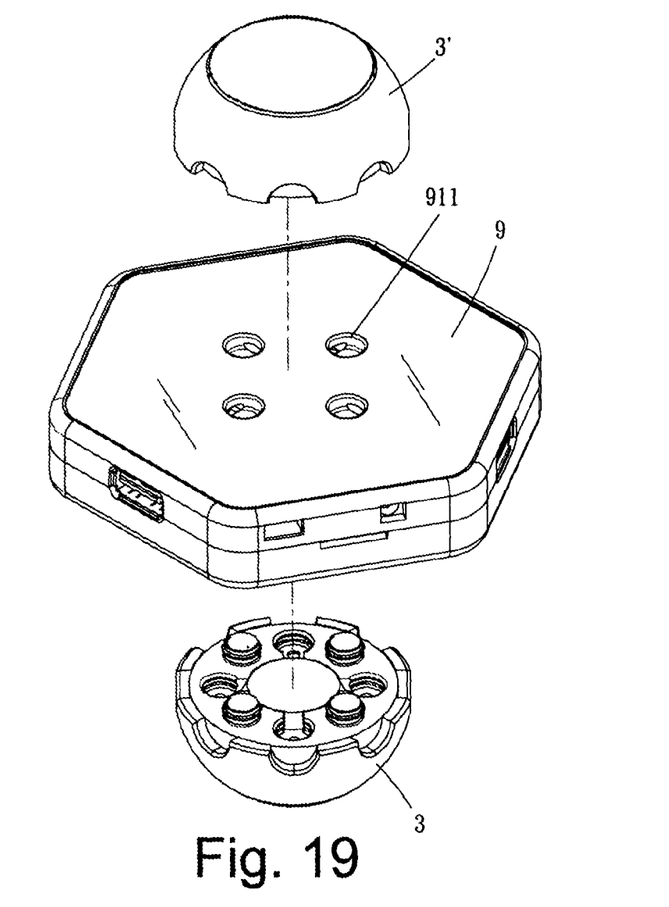
FIG. 19 is a partial exploded perspective view of the notebook cooling pad and expansion/connection/card-reading all-in-one station combination device according to the present invention.
Figure 20:
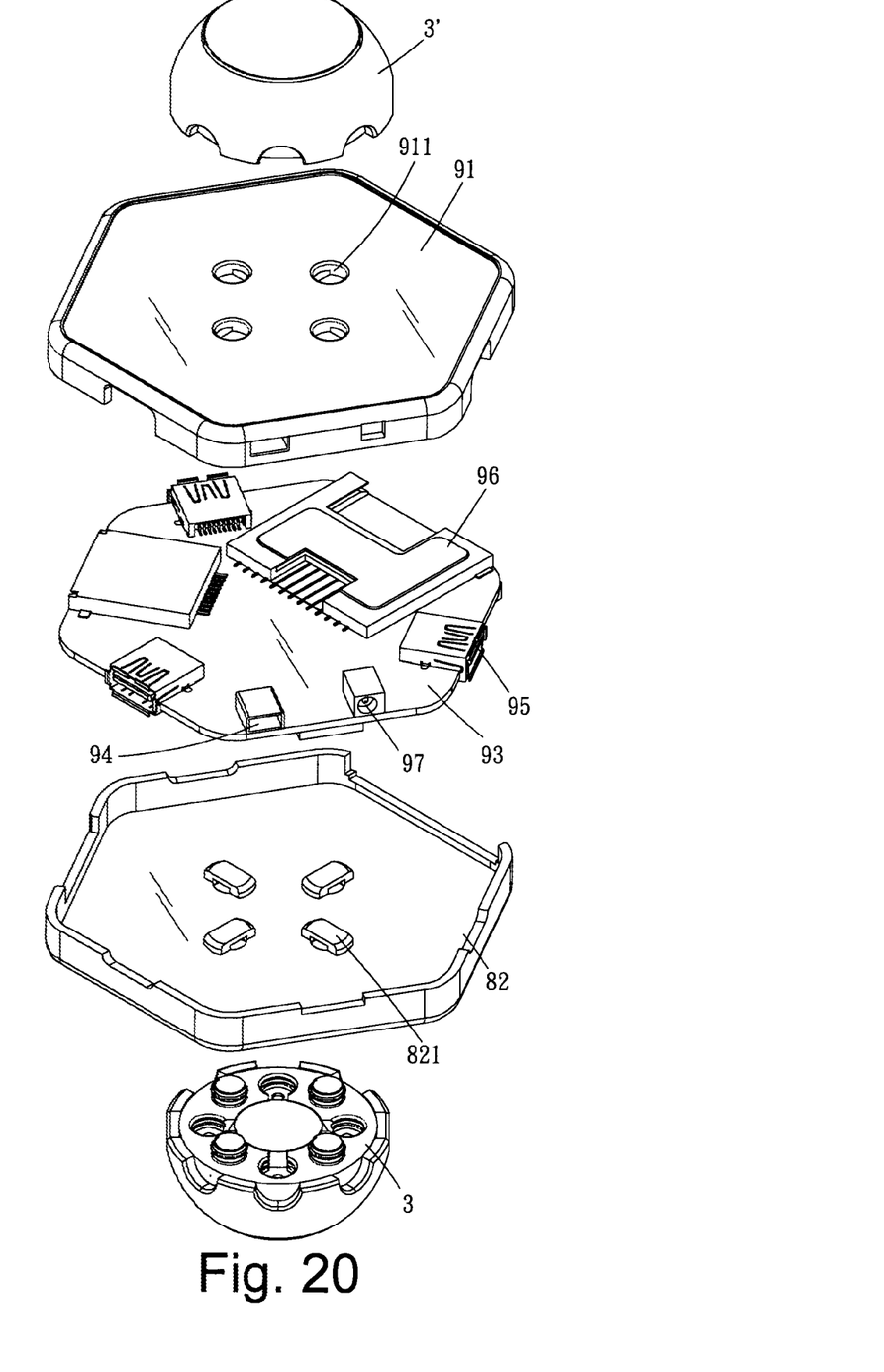
FIG. 20 is an exploded perspective view of the notebook cooling pad and expansion/connection/card-reading all-in-one station combination device according to the present invention.
Figure 21:
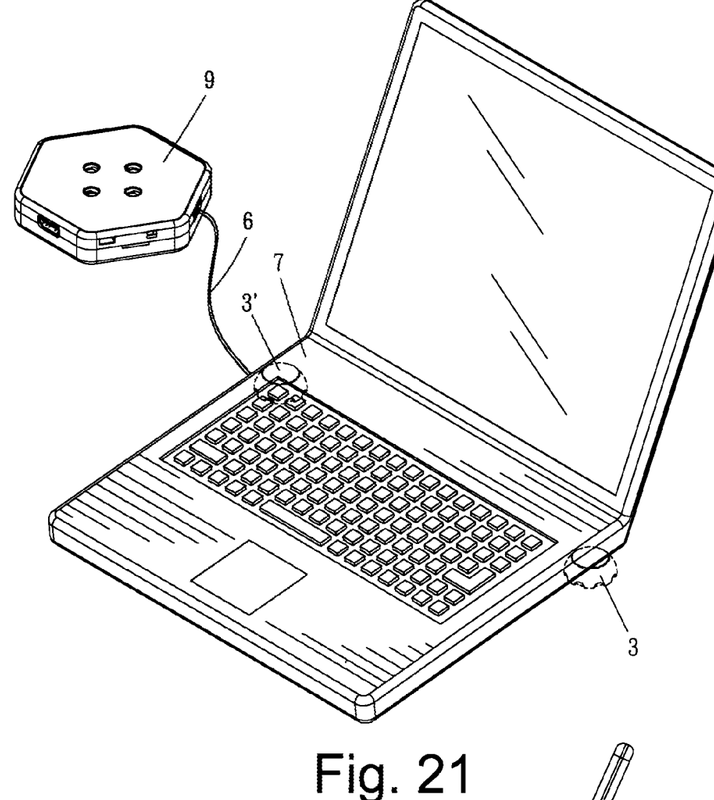
FIG. 21 is a perspective view of a notebook cooling pad, an expansion/connection/card-reading all-in-one station, and a notebook computer in operation according to the present invention.
Figure 22:
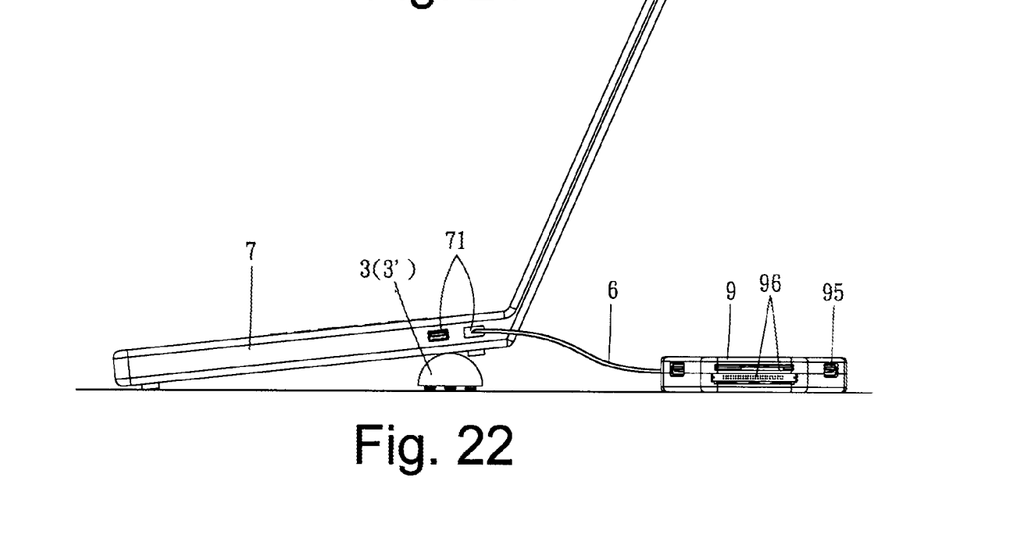
FIG. 22 is a side view of the notebook cooling pad, the expansion/connection/card-reading all-in-one station, and the notebook computer in operation according to the present invention.

Referring to FIG. 18 through FIG. 20, the present invention provides a notebook cooling pad, fan seat, docking station, and/or card reading station combination device, wherein a notebook cooling pad and expansion/connection/card-reading all-in-one station combination device is designed in a manner that a docking station and a card reading station are integrated into a notebook cooling pad and expansion/connection/card-reading all-in-one station combination device. The notebook cooling pad and expansion/connection/card-reading all-in-one station combination device involves coupling together the paired symmetric hemispheric cooling pads 3, 3' and an expansion/connection/card-reading all-in-one station 9, and essentially comprises the expansion/connection/card-reading all-in-one station 9, the paired symmetric hemispheric cooling pads 3, 3', and the USB cable 6. The expansion/connection/card-reading all-in-one station 9 comprises an upper casing 91, a lower casing 92, and a circuit board 93 fixedly disposed in an internal space defined between the upper and lower casings 91, 92. Recesses 911, 921 are disposed on the upper casing 91 and the lower casing 92, respectively. A USB input end 94 is disposed on the circuit board 93. A plurality of USB expanding and connecting ends 95 and a plurality of card-reading connecting ends 96 are electrically connected by the USB cable 6 to the USB connecting terminal 71 of the personal computer or the notebook computer 7 and a USB input end 94 of the expansion/connection/card-reading all-in-one station 9, as shown in FIG. 21 and FIG. 22, thereby not only providing cooling pads for the notebook computer 7, but also providing the expansion/connection/card-reading all-in-one station 9 functioning as a card reader and an external hub for use with computer.

Optionally, direct current input ends 87, 97 are disposed on the circuit boards 83, 93 of the card reading station 8 and the expansion/connection/card-reading all-in-one station 9, respectively, for supplying sufficient power to the plurality of card-reading connecting ends 85, the plurality of USB expanding and connecting ends 95, and the plurality of card-reading connecting ends 96 to meet the power requirement of concurrent operation thereof.

What is claimed is:

1. A notebook cooling pad, fan seat, docking station, and/or card reading station combination device, wherein a notebook cooling pad and fan seat combination device essentially comprises a fan seat 1, a fan 2, paired symmetric hemispheric cooling pads 3, 3', and a USB cable 4;

wherein the fan seat 1 comprises an upper cover 11 and a lower cover 12, wherein ventilating slits 111, 121 and recesses 112, 122 are disposed on the upper cover 11 and the lower cover 12, respectively, wherein a fan 2 is fixedly disposed in an internal space defined between the upper cover 11 and the lower cover 12 and electrically connected to the USB cable 4 through a power terminal 13, wherein the USB cable 4 can be plugged to a USB connecting terminal 71 of the personal computer or the notebook computer 7 so as to receive power for driving the fan 2 to operate;

wherein paired symmetric flanges 31 and recesses 32 are disposed on mating surfaces of the paired symmetric hemispheric cooling pads 3, 3', such that the paired symmetric hemispheric cooling pads 3, 3' are attached to and coupled to the upper cover 11 and the lower cover 12, respectively, when the flanges 31 of the paired symmetric hemispheric cooling pads 3, 3' are inserted into and engaged with the recesses 112, 122 of the upper cover 11 and the lower cover 12, respectively, thereby allowing the combination device to function as a saucer-shaped ornament and to be carried around with ease.

2. The combination device of claim 1, wherein the fan seat 1 of the notebook cooling pad and fan seat combination device is provided with a rotating brace 14 and two paired symmetric support elements 15, 15' whereby the fan seat 1 is rotated, unfolded, and orientated at different adjustable angles.

3. The combination device of claim 1, wherein the paired symmetric hemispheric cooling pads 3, 3' of the notebook cooling pad and fan seat combination device are removed from the upper cover 11 and the lower cover 12 and positioned beneath the notebook computer 7 to thereby function as notebook cooling pads, respectively.

4. The combination device of claim 1, wherein the fan seat 1 of the notebook cooling pad and fan seat combination device can be adjusted and oriented at an intended angle and positioned before or beside the notebook computer 7 for dissipating heat.

5. A notebook cooling pad, fan seat, docking station, and/or card reading station combination device, wherein a notebook cooling pad and docking station combination device involves coupling together paired symmetric hemispheric cooling pads 3, 3' and a docking station 5 and essentially comprises the docking station 5, the paired symmetric hemispheric cooling pads 3, 3', and a USB cable 6;

wherein the docking station 5 comprises an upper lid 51, a lower lid 52, and a circuit board 53 fixedly disposed in an internal space defined by the upper lid 51 and the lower lid 52, wherein recesses 511, 521 are disposed on the upper lid 51 and the lower lid 52, respectively, wherein a USB input end 54 and a plurality of USB expanding and connecting ends 55 are disposed on the circuit board 53 and electrically connected by the USB cable 6 to a USB connecting terminal 71 of the personal computer or the notebook computer 7 and the USB input end 54 of the docking station 5, thereby not only providing cooling pads for the notebook computer 7, but also providing the docking station 5 functioning as an external USB hub for use with computer.

6. A notebook cooling pad, fan seat, docking station, and/or card reading station combination device, wherein a notebook cooling pad and card reading station combination device involves coupling together paired symmetric hemispheric cooling pads 3, 3' and a card reading station 8 and essentially comprises the card reading station 8, the paired symmetric hemispheric cooling pads 3, 3', and a USB cable 6;

wherein the card reading station 8 comprises an upper covering 81, a lower covering 82, and a circuit board 83 fixedly disposed in an internal space defined by the upper covering 81 and the lower covering 82, wherein recesses 811, 821 are disposed on the upper covering 81 and the lower covering 82, respectively, wherein a USB input end 84 and a plurality of card-reading connecting ends 85 are disposed on the circuit board 83 and electrically connected by the USB cable 6 to a USB connecting terminal 71 of the personal computer or the notebook computer 7 and the USB input end 84 of the card reading station 8, thereby not only providing cooling pads for the notebook computer 7, but also providing the card reading station 8 functioning as an external card reader for use with computer.

7. The combination device of claim 6, wherein, optionally, direct current input ends 87, 97 are disposed on the circuit boards 83, 93 of the card reading station 8 and the expansion/connection/card-reading all-in-one station 9, respectively, for supplying sufficient power to the plurality of card-reading connecting ends 85, the plurality of USB expanding and connecting ends 95, and the plurality of card-reading connecting ends 96 to meet the power requirement of concurrent operation thereof.

8. A notebook cooling pad, fan seat, docking station, and/or card reading station combination device, wherein a notebook cooling pad and expansion/connection/card-reading all-in-one station combination device is designed in a manner that a docking station and a card reading station are integrated into the notebook cooling pad and expansion/connection/card-reading all-in-one station combination device, wherein the notebook cooling pad and expansion/connection/card-reading all-in-one station combination device essentially involves coupling together paired symmetric hemispheric cooling pads 3, 3' and an expansion/connection/card-reading all-in-one station 9, wherein the notebook cooling pad and expansion/connection/card-reading all-in-one station combination device essentially comprises the expansion/connection/card-reading all-in-one station 9, the paired symmetric hemispheric cooling pads 3, 3', and a USB cable 6; wherein the expansion/connection/card-reading all-in-one station 9 comprises an upper casing 91, a lower casing 92, and a circuit board 93 fixedly disposed in an internal space defined by the upper casing 91 and the lower casing 92, wherein recesses 911, 921 are disposed on the upper casing 91 and the lower casing 92, respectively, wherein a USB input end 94, a plurality of USB expanding and connecting ends 95, and a plurality of card-reading connecting ends 96 are disposed on the circuit board 93 and electrically connected by the USB cable 6 to a USB connecting terminal 71 of the personal computer or the notebook computer 7 and the USB input end 94 of the expansion/connection/card-reading all-in-one station 9, thereby not only providing cooling pads for the notebook computer 7, but also providing the expansion/connection/card-reading all-in-one station 9 functioning as a card reader and an external hub for use with computer.

9. The combination device of claim 8, wherein, optionally, direct current input ends 87, 97 are disposed on the circuit boards 83, 93 of the card reading station 8 and the expansion/connection/card-reading all-in-one station 9, respectively, for supplying sufficient power to the plurality of card-reading connecting ends 85, the plurality of USB expanding and connecting ends 95, and the plurality of card-reading connecting ends 96 to meet the power requirement of concurrent operation thereof.

\* \* \* \* \*